Figure 1:
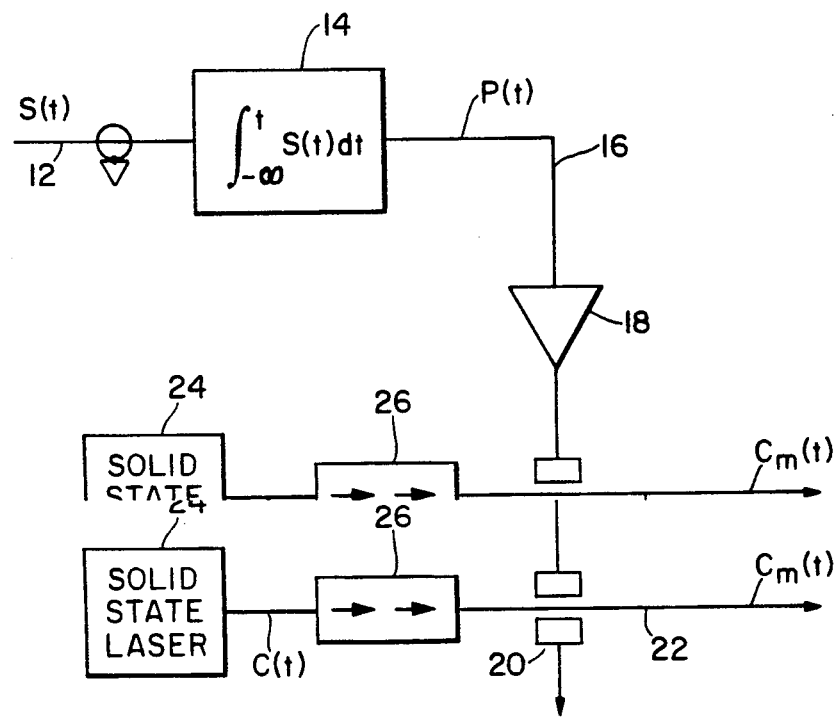

United States Patent [19]
Fitzmartin et al.

[11] Patent Number: 5,157,542
[45] Date of Patent: Oct. 20, 1992

[54] OPTICAL FM MODULATION SYSTEM

[75] Inventors: Daniel J. Fitzmartin, Newton; Edmund J. Balboni, Wakefield, both of Mass.

[73] Assignee: The Charles Stark Draper Laboratory, Inc., Cambridge, Mass.

[21] Appl. No.: 641,464

[22] Filed: Jan. 15, 1991

[51] Int. Cl.$^5$ ............................ H04B 9/00; H04L 9/00
[52] U.S. Cl. ........................... 359/278; 359/183; 385/3
[58] Field of Search ............... 359/182, 183, 238, 278, 359/279, 287; 385/3

[56] References Cited

U.S. PATENT DOCUMENTS

| | | | |
|---|---|---|---|
| 3,666,956 | 5/1972 | Willisen | 325/60 |
| 4,123,719 | 10/1978 | Hopwood et al. | 328/155 |
| 4,726,064 | 2/1988 | Kishi et al. | 380/9 |

OTHER PUBLICATIONS

Fitzmartin et al.; "Wide-Band Analog Frequency Modulation of Optic Signals Using Indirect Techniques"; Proc. SPIE, Int. Soc. Opt. Eng., San Jose, Ca., Sep. 18, 1990, vol. 1371, pp. 78–86.

Primary Examiner—Nelson Moskowitz
Attorney, Agent, or Firm—Iandiorio & Dingman

[57] ABSTRACT

An optical FM modulation system includes a continuous wave optical light source for producing an optical carrier wave; integration means, responsive to an FM modulating signal, for generating a phase signal representative of the phase variations corresponding to the frequency variations of the FM modulating signal; and an electro-optic phase modulator, responsive to the electrical signal representative of the phase variations, for shifting the phase of the optical carrier wave to modulate the frequency of the optical carrier wave as a function of the modulating signal.

9 Claims, 4 Drawing Sheets

OPTICAL FM MODULATION SYSTEM

FIELD OF INVENTION

This invention relates to an optical FM modulation system, and more particularly to such a system which employs optical phase modulation to achieve optical frequency modulation.

BACKGROUND OF INVENTION

Intensity modulation, that is AM modulation, in optical systems suffers for the fact that continuous wave (cw) optical sources to be modulated, such as lasers, have inherent intensity modulated (AM) noise on the light wave envelope. Thus any intensity modulation system starts out burdened by an initial noise level which is introduced by the laser source itself even before modulation by the message signal and processing by the various components which typically introduce their own noise. Further, both the techniques for AM modulation—direct injection current modulation of a diode laser, and indirect modulation using a Mach-Zender interferometer—suffer from limited linearity. The problems associated with AM modulation could be eliminated by using FM modulation. However, diode lasers which are susceptible of FM modulation suffer from intensity noise and phase noise as well as incidental amplitude modulation which accompanies all FM modulations at high enough rates to be widely utilized.

SUMMARY OF INVENTION

It is therefore an object of this invention to provide an improved optical modulation system.

It is a further object of this invention to provide an FM optical modulation system.

It is a further object of this invention to provide such a system which allows the use of lasers with low phase noise and low intensity noise.

It is a further object of this invention to provide such a system which allows the use of lasers with high output power.

It is a further object of this invention to provide such a system which allows the use of a wide band highly linear modulator.

It is a further object of this invention to provide such a system which uses a solid state laser.

It is a further object of this invention to provide such a system which uses an integrated optics phase modulator.

It is a further object of this invention to provide such a system which allows the use of a laser which cannot be modulated.

The invention results from the realization that the frequency of the output of any laser can be modulated in accordance with the frequency variation of an FM modulating signal by integrating that FM modulating signal to obtain a phase signal which represents the phase variation corresponding to the frequency variation of the FM modulating signal and using that phase signal to drive an electro optic phase modulator.

This invention features an optical FM modulation system. A continuous wave optical light source provides an optical carrier wave. Integration means responsive to an FM modulating signal generates a phase signal representative of the phase variations corresponding to the frequency variations of the FM modulating signal. An electro-optical phase modulator responsive to the electrical signal representative of the phase variations shifts the phase of the optical carrier wave to modulate the frequency of the optical carrier wave as a function of the modulating signal.

In a preferred embodiment, the light source is a laser and the laser may be a solid state laser. The light source may include an optical isolator and the electro-optic phase modulator may be a bulk optic device or a lithium niobate crystal. The integration means may include an integrator circuit and an equalizer circuit. The integrator circuit may include a capacitor and the equalizer circuit may include a cascade of octave bandwidth LC all pass filter stages.

DISCLOSURE OF PREFERRED EMBODIMENT

Figure 5:
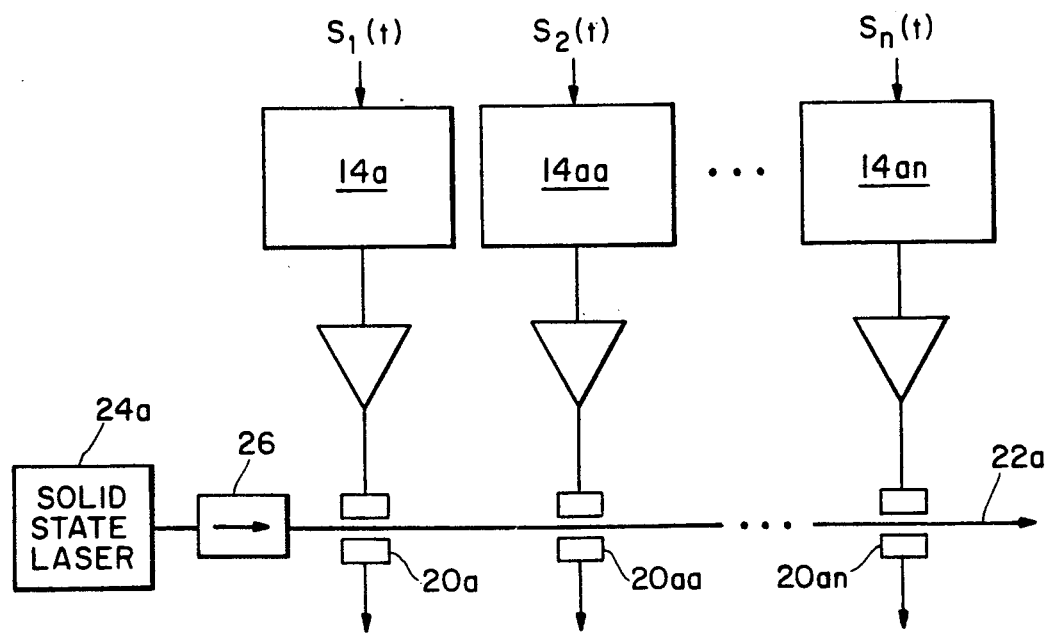
Figure 2A:
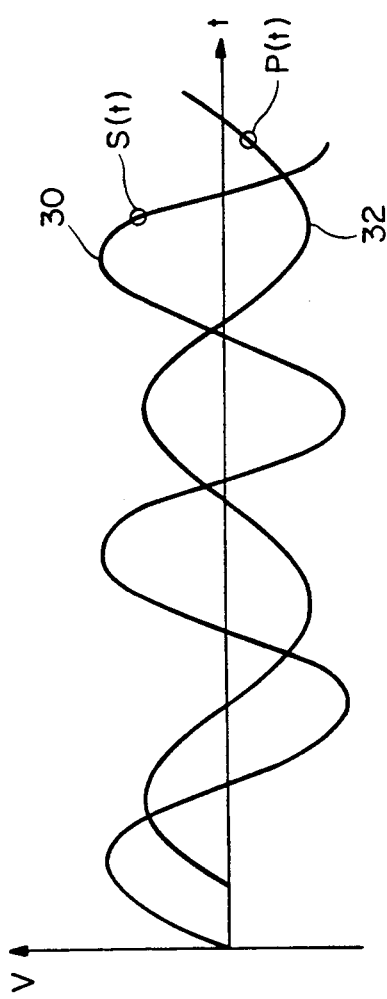
Figure 3A:
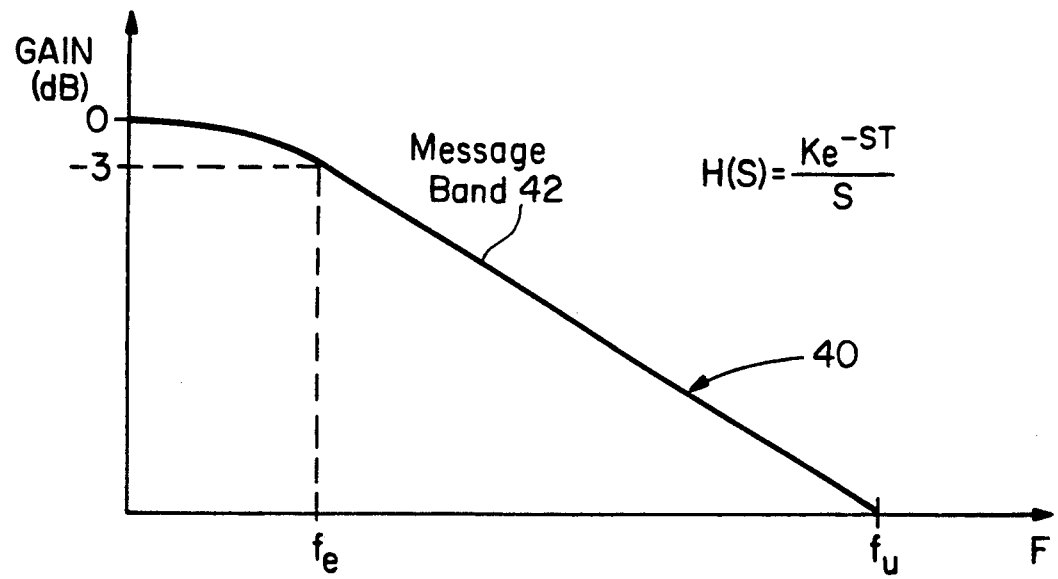
Figure 4:
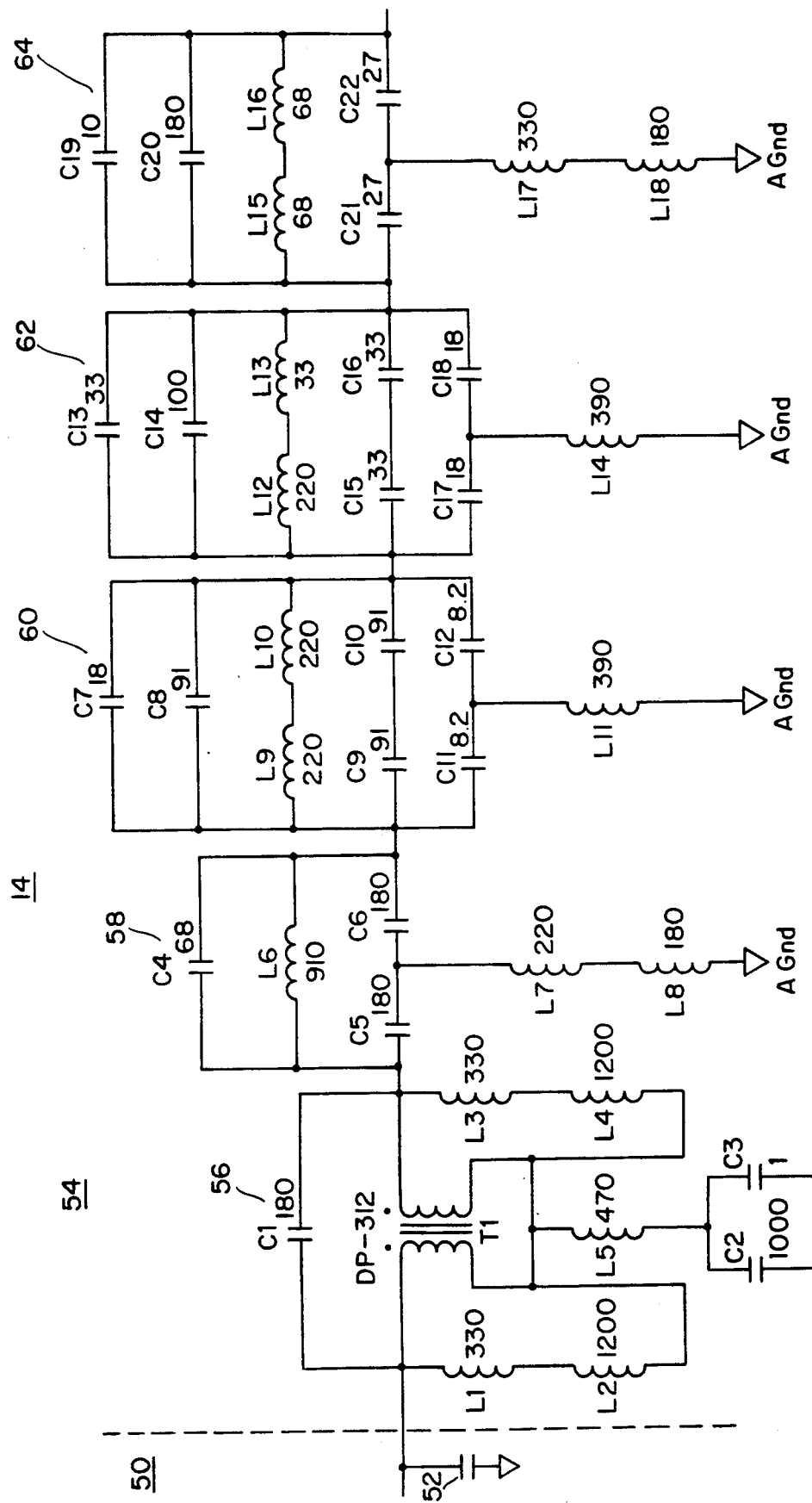

Other objects, features and advantages will occur to those skilled int he art from the following description of a preferred embodiment and the accompanying drawings, in which:

FIG. 1 is a block diagram of an FM modulation system according to this invention;

FIGS. 2A, B and C are illustrations of the FM modulating signal, the corresponding phase signal, the unmodulated optical carrier, and the modulated optical carrier which occur in the system of FIG. 1;

FIGS. 3A and B are illustrations of the amplitude response characteristic of the integrator and the delay characteristic after equalization for the system of FIG. 1;

FIG. 4 is a typical integrator and equalizer circuit which can be used in the RF range; and FIG. 5 is a schematic block diagram of an optical FM modulation system according to this invention having multiple spectrally distinct modulating signals imposed on the laser output.

The invention may be accomplished in an optical FM modulation system using a continuous wave optical light source for producing an optical carrier wave. The light source is typically a laser, for example a solid state laser, which operates in the range of $2.2 \times 10^{14}$ Hz. An integration means responsive to an FM modulating signal, which may for example be in the range of 30 GHz, generates a phase signal representative of the phase variations which correspond to the frequency variations of the FM modulating signal. The integration means typically includes an integration circuit such as a capacitor, and an equalizer to adjust the phase to a constant level where it can be treated as a simple delay. An electro-optic phase modulator responds to the electrical signal representative of the phase variations and shifts the phase of the optical carrier wave so as to modulate the frequency of the optical carrier wave as a function of the modulating signal.

There is shown in FIG. 1 an optical FM modulation system 10 according to this invention including an input terminal which receives the FM modulating signal S(t) and delivers it to terminal 12, which receives the FM modulating signal S(t) and delivers it to integrator 14. The integration of the frequency varying input signal S(t) results in an output signal P(t) which is a phase signal representative of the phase variations corresponding to the frequency variations of the FM modulating signal S(t). The phase signal P(t) is delivered on line 16 to amplifier 18, whose output drives the electro-optic phase modulator 20. Phase modulator 20 may be a lithium niobate crystal with titanium indiffused optical waveguide, or any of a number of bulk optical devices such as lithium tantalate, barium titanate, KD*P. The laser beam 22 provided from any laser, such as for example solid state laser 24, thereby has its phase modulated in accordance with the frequency of an FM modulating signal. A conventional optical isolator 26 may be used to prevent reflection. The resulting modulation is highly effective as the broad bandwidth of up to 20 gigahertz, for example, is but a small percentage of the frequency of the carrier wave output of the laser which is typically in the range of $2.2 \times 10^{14}$ Hz.

Figure 2B:
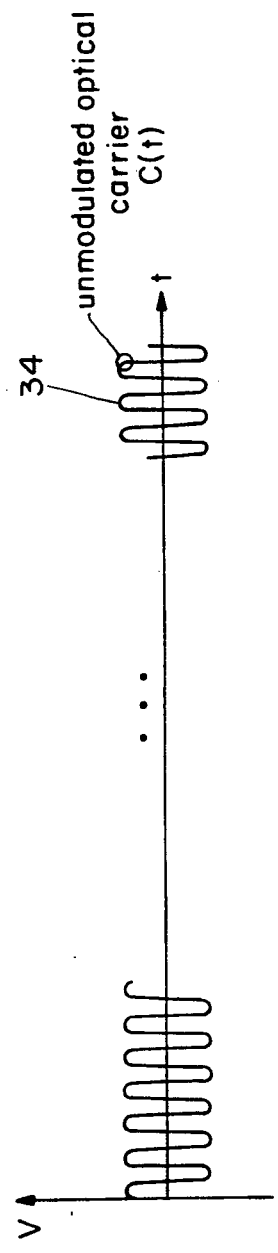
Figure 2C:
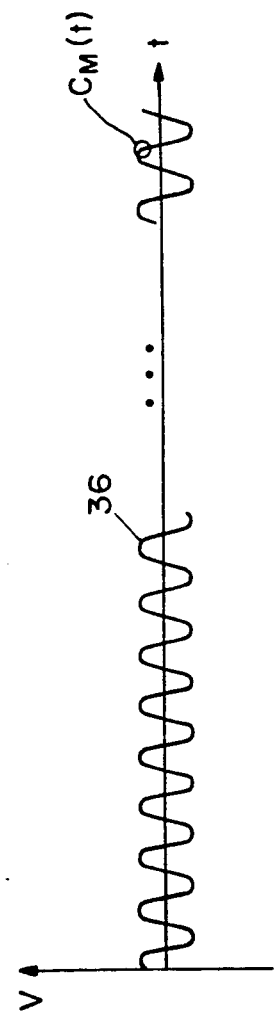

A typical modulating signal 30 and phase signal 32 are illustrated in FIG. 2A, along with the unmodulated optical carrier 34 and the modulated optical carrier 36 in FIGS. 2B and C. Integrator 14 has a typical amplitude response 40, FIG. 3, with the 6 DB/octave rolloff. The typical message band 42 extends from the lower frequency to the upper frequency $f_u$. In a typical circuit in the RF range this may be from 2-30 MHz or from 2-500 MHz, or any other range which is desirable for the particular application. Since the integration portion of the circuit introduces a variable delay which will distort the phase variation of signal P(t), an equalizer is used to make the delay constant so that the integration operation appears as simply an integration followed by a delay. The delay after equalization appears as illustrated by the delay characteristic 44 in FIG. 3B, where the section in the message band 42 appears relatively flat or constant, between the lower $f_1$ and upper $f_u$ limits of the message band.

Figure 3B:
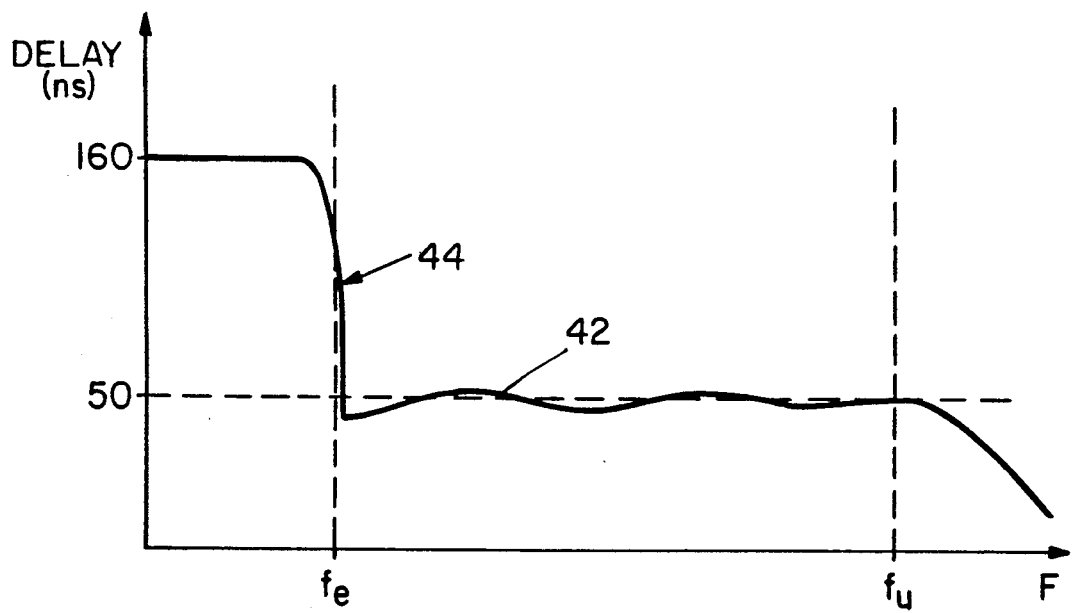

An equalizer circuit for effecting the constant delay as shown in FIG. 3B is illustrated as a part of the integrator 14 in FIG. 4. Integrator 14 thus includes an integrating circuit 50 which may include simply a capacitor 52 and an equalizer circuit 54, which includes a plurality of cascaded octave bandwidth LC all pass filter stages 56, 58, 60, 62 and 64, that contain the various inductances an capacitances whose values are expressed in picofarads and nanohenries for an equalizer for use in the 2-30 MHz band.

Equalizers in the DC to RF range, up to approximately 100 MHz, can be made using active circuits, while LC circuits such as shown in FIG. 4 are useful in the RF range from 1 MHz to 500 MHz. Distributed circuit equalizers may be used in the microwave range from 100 MHz to 20 GHz. The integrator may be designed using the SUPERSTAR software from Eagleware, Inc., of 1750 Mountain Glen, Stone Mountain, Ga. The equalizer may be designed using EQUALIZE software obtainable from the same source. Parasitics can be added to the circuit model using TOUCHSTONE software available from EEsof, Inc., 5795 Lindaro Canyon Road, Westlake Village, Calif., and the device can actually be built and tested using a network analyzer obtainable from Hewlett-Packard.

Since the modulation band available at laser frequencies is so broad, a plurality of spectrally distinct modulating signals can be imposed on the beam as shown in FIG. 5, where the output beam 22a of laser 24a is modulated by a series of electro-optic phase modulators 20a, 20aa and 20an, each modulated by a different modulating signal $S_1(t)$, $S_2(t)$, ... $S_n(t)$.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An optical FM modulation system comprising:
    a continuous wave optical light source for producing an optical carrier wave;
    integration means, responsive to an FM modulating signal, for generating a phase signal representative of the phase variations corresponding to the frequency variations of the FM modulating signal; and
    an electro-optic phase modulator, responsive to said electrical signal representative of the phase variations, for shifting the phase of the optical carrier wave to modulate the frequency of the optical carrier wave as a function of the modulating signal.

2. The optical FM modulation system of claim 1 in which said light source is a laser.

3. The optical FM modulation system of claim 2 in which said laser is a solid state laser.

4. The optical FM modulation system of claim 2 in which said light source includes an optical isolator.

5. The optical FM modulation system of claim 1 in which said electro-optic phase modulator is a bulk optic device.

6. The optical FM modulation system of claim 5 in which said electro-optic phase modulator includes a lithium niobate crystal.

7. The optical FM modulation system of claim 1 in which said integration means includes an integrator circuit and an equalizer circuit.

8. The optical FM modulation system of claim 7 in which said integrator circuit includes a capacitor.

9. The optical FM modulation system of claim 7 in which said equalizer circuit includes a cascade of octave bandwidth LC all pass filter stages.

* * * * *